(12) United States Patent
Takada et al.

(10) Patent No.: US 10,107,947 B2
(45) Date of Patent: Oct. 23, 2018

(54) POLARIZER, POLARIZING PLATE, AND METHOD FOR PRODUCING POLARIZER

(71) Applicant: NITTO DENKO CORPORATION, Ibaraki-shi, Osaka (JP)

(72) Inventors: Katsunori Takada, Ibaraki (JP); Kota Nakai, Ibaraki (JP); Naotaka Higuchi, Ibaraki (JP); Keisuke Kimura, Ibaraki (JP); Yoshitsugu Kitamura, Ibaraki (JP); Hiroki Kuramoto, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/545,766

(22) PCT Filed: Mar. 10, 2016

(86) PCT No.: PCT/JP2016/057495
§ 371 (c)(1),
(2) Date: Jul. 24, 2017

(87) PCT Pub. No.: WO2016/167060
PCT Pub. Date: Oct. 20, 2016

(65) Prior Publication Data
US 2018/0011233 A1    Jan. 11, 2018

(30) Foreign Application Priority Data

Apr. 17, 2015  (JP) ................. 2015-085107

(51) Int. Cl.
*G02B 5/30* (2006.01)
*G02B 1/14* (2015.01)
*C08J 3/24* (2006.01)
(Continued)

(52) U.S. Cl.
CPC ........ *G02B 5/305* (2013.01); *B29D 11/00644* (2013.01); *C08J 3/24* (2013.01);
(Continued)

(58) Field of Classification Search
CPC .......... G02B 1/08; G02B 1/14; G02B 5/3033; G02B 5/305; B29D 11/0644
(Continued)

(56) References Cited

U.S. PATENT DOCUMENTS 8,817,373 B2   8/2014   Kobayashi et al.
9,227,222 B2   1/2016   Izaki et al.
(Continued)

FOREIGN PATENT DOCUMENTS

JP   2005-84507 A   3/2005
JP   2009-37228 A   2/2009
(Continued)

OTHER PUBLICATIONS

International Search Report dated Jun. 7, 2016, issued in counterpart application No. PCT/JP2016/057495, w/English translation. (5 pages).

*Primary Examiner* — Ricky D Shafer
(74) *Attorney, Agent, or Firm* — Westerman, Hattori, Daniels & Adrian, LLP (57) ABSTRACT

There is provided a polarizer excellent in durability. A polarizer according to one embodiment of the present invention includes a resin film containing boric acid, wherein the resin film has a low-concentration portion, which contains a lower concentration of the boric acid than that in any other site, formed in an end portion thereof.

16 Claims, 6 Drawing Sheets

(51) Int. Cl.
*C08J 5/18* (2006.01)
*G02B 1/08* (2006.01)
*B29D 11/00* (2006.01)

(52) U.S. Cl.
CPC .................... *C08J 5/18* (2013.01);
*G02B 1/08* (2013.01); *G02B 1/14* (2015.01);
*G02B 5/3033* (2013.01); *C08J 2329/04*
(2013.01)

(58) Field of Classification Search
USPC ............ 359/487.01, 487.02, 900; 427/163.1
See application file for complete search history.

(56) References Cited

U.S. PATENT DOCUMENTS 9,453,953 B2   9/2016   Izaki et al.
2006/0227423 A1*  10/2006  Saiki .................... G02B 5/3033
                                             359/487.02
2011/0019274 A1   1/2011   Kobayashi et al.
2013/0114137 A1*  5/2013   Bae ...................... G02B 5/3083
                                             359/483.01
2013/0128357 A1   5/2013   Izaki et al.
2016/0047960 A1   2/2016   Izaki et al.
2016/0146994 A1*  5/2016   Kim ....................... G02B 5/305
                                             359/487.01
2017/0123125 A1*  5/2017   Takada ..................... G02B 1/14
2017/0299920 A1*  10/2017  Mita .................... C08K 5/0025
2018/0120488 A1*  5/2018   Takada ................ G02B 5/3025

FOREIGN PATENT DOCUMENTS

JP       2013-11837 A       1/2013
JP       2013-254072 A      12/2013
JP       2014-167654        9/2014

* cited by examiner

POLARIZER, POLARIZING PLATE, AND METHOD FOR PRODUCING POLARIZER

TECHNICAL FIELD

The present invention relates to a polarizer, a polarizing plate, and a method of producing the polarizer.

BACKGROUND ART

A polarizer has been used in an image display apparatus (e.g., a liquid crystal display apparatus) of a cellular phone, a notebook personal computer, or the like. In recent years, the use of the polarizer in, for example, a meter display portion of an automobile or a smart watch has been desired, and hence the formation of the polarizer into a shape except a rectangular shape and the formation of a through-hole in the polarizer have been desired. However, when any such form is adopted, a problem in terms of durability is liable to occur. For the purpose of improving the durability, for example, there has been proposed a polarizing plate obtained by respectively bonding a pair of polarizer protective films to both main surfaces of a polarizer, and melting the resultant, followed by solidification to form a surface serving as an outer peripheral end surface (see Patent Literature 1). However, a further improvement in durability has been required.

CITATION LIST

Patent Literature

[PTL 1] JP 2009-37228 A

SUMMARY OF INVENTION

Technical Problem

The present invention has been made to solve the problem, and a primary object of the present invention is to provide a polarizer excellent in durability.

Solution to Problem

According to one aspect of the present invention, a polarizer is provided. The polarizer includes a resin film containing boric acid, wherein the resin film has a low-concentration portion, which contains a lower concentration of the boric acid than that in any other site, formed in an end portion thereof.

In one embodiment of the invention, the low-concentration portion has such a concentration gradient that the concentration of the boric acid contained therein reduces outward in a plane direction.

In one embodiment of the invention, the low-concentration portion is formed in a region ranging from an end surface of the resin film to a position distant therefrom by 50 µm or more inward in a plane direction.

In one embodiment of the invention, the low-concentration portion is formed in an end portion in an absorption axis direction.

In one embodiment of the invention, the polarizer has formed therein a through-hole and the low-concentration portion is formed in a peripheral edge portion of the through-hole.

In one embodiment of the invention, the low-concentration portion is formed in an outer edge portion.

In one embodiment of the invention, the outer edge portion includes a site that forms a substantially V-shape that is convex inward in a plane direction.

According to another aspect of the present invention, a polarizing plate is provided. The polarizing plate includes the polarizer; and a protective film arranged on at least one surface of the polarizer.

According to still another aspect of the present invention, a production method for a polarizer is provided. The production method includes a step of bringing a treatment liquid into contact with a resin film containing boric acid, to thereby form a low-concentration portion, which contains a lower concentration of the boric acid than that in any other site, in an end portion of the resin film.

In one embodiment of the invention, the treatment liquid contains water.

In one embodiment of the invention, the treatment liquid includes a solution obtained by dissolving, in a solvent, a compound containing a substance capable of forming a counterion for iodine.

In one embodiment of the invention, the compound contains potassium iodide and/or sodium chloride.

In one embodiment of the invention, the treatment liquid has a liquid temperature of 50° C. or more.

In one embodiment of the invention, the production method further includes a step of forming the resin film containing boric acid into a desired shape through cutting and/or punching.

In one embodiment of the invention, the cutting and/or the punching is performed by laser light irradiation.

In one embodiment of the invention, the laser light comprises $CO_2$ laser light.

Advantageous Effects of Invention

According to the present invention, the polarizer extremely excellent in durability can be obtained by forming the low-concentration portion, which contains a lower concentration of boric acid than that in any other site, in an end portion of the polarizer.

DESCRIPTION OF EMBODIMENTS

Embodiments of the present invention are described below. However, the present invention is not limited to these embodiments.

A. Polarizer (Polarizing Plate)

Figure 1:
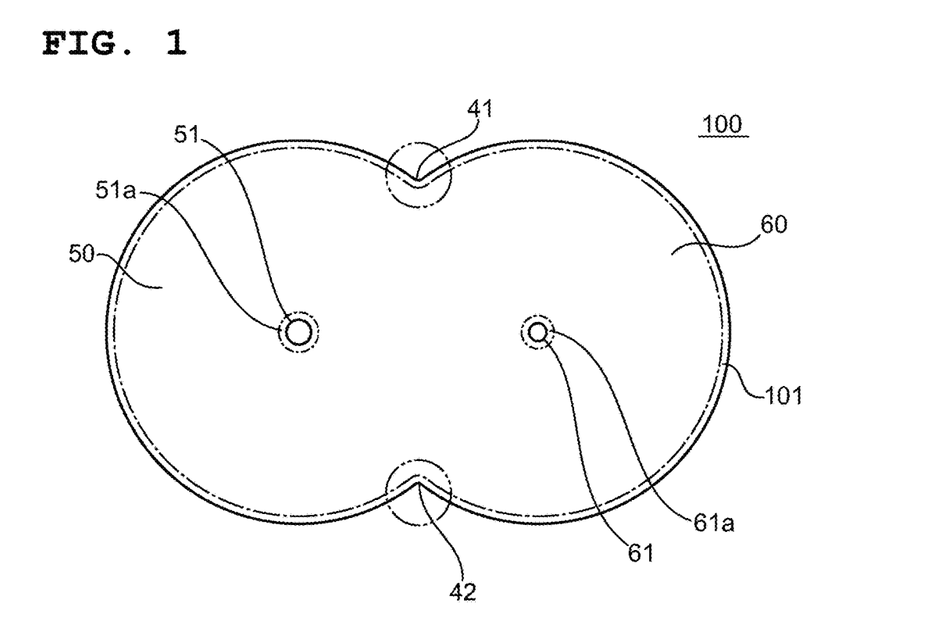
FIG. 1 is a plan view of a polarizing plate according to one embodiment of the present invention.
Figure 2:
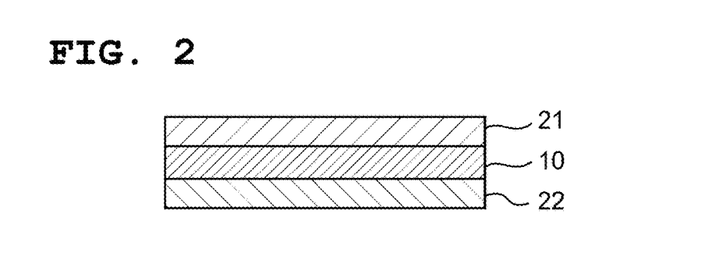
FIG. 2 is a partial enlarged sectional view of the polarizing plate illustrated in FIG. 1.

FIG. 1 is a plan view of a polarizing plate according to one embodiment of the present invention, and FIG. 2 is a partial enlarged sectional view of the polarizing plate illustrated in FIG. 1. A polarizing plate 100 is suitably used in the meter panel of an automobile. The polarizing plate 100 includes a first display portion 50 and a second display portion 60 that are continuously arranged, and through-holes 51 and 61 for fixing various meter needles are formed around the centers of the respective display portions. The diameter of each of the through-holes is, for example, from 0.5 mm to 100 mm. The outer edge of each of the display portions 50 and 60 is formed into an arc shape along the rotational direction of a meter needle.

In general, a polarizer is used in a state of having a protective film laminated thereon (as a polarizing plate). The polarizing plate 100 of the illustrated example includes a polarizer 10 and a pair of protective films 21 and 22 respectively arranged on both main surfaces of the polarizer 10. In the illustrated example, protective films are arranged on both main surfaces of the polarizer. However, a protective film may be arranged on only one of the surfaces.

The polarizer includes a resin film. Any appropriate resin may be used as a resin for forming the resin film. A polyvinyl alcohol-based resin (hereinafter referred to as "PVA-based resin") is preferably used. Examples of the PVA-based resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably 95.0 mol % or more, more preferably 99.0 mol % or more, particularly preferably 99.93 mol % or more. The saponification degree may be determined in conformity with JIS K 6726-1994. The use of the PVA-based resin having such saponification degree can provide a polarizer excellent in durability.

The average polymerization degree of the PVA-based resin may be appropriately selected depending on purposes. The average polymerization degree is typically from 1,000 to 10,000, preferably from 1,200 to 6,000, more preferably from 2,000 to 5,000. The average polymerization degree may be determined in conformity with JIS K 6726-1994.

The polarizer (resin film) 10 contains boric acid, and has a low-concentration portion, which contains a lower concentration of boric acid than that in any other site, formed in each of end portions thereof (specifically an outer edge portion 101 and peripheral edge portions 51a and 61a of the through-holes 51 and 61). When the low-concentration portion is formed, the durability can be improved. Specifically, the occurrence of a crack can be suppressed. In general, a polarizer has a shrinking force larger than that of a protective film, and hence a crack may occur owing to the occurrence of a stress in a boundary between the polarizer and the protective film due to changes in temperature and humidity. In the low-concentration portion, for example, a cross-linked structure formed by boric acid is removed, and hence the low-concentration portion can have rigidity lower than that of any other site. As a result, in the low-concentration portion, a stress due to the shrinkage of the polarizer is relaxed, and hence the occurrence of the crack can be suppressed. Therefore, when the low-concentration portion is formed in a site on which a stress is liable to concentrate, such as the peripheral edge of a through-hole or a site that forms a V-shape to be described later, the occurrence of the crack can be effectively suppressed. In addition, according to such mode, influences on the external appearance of the polarizer and its bonding to another member are extremely small.

The low-concentration portion has, for example, such a concentration gradient that the concentration of boric acid contained therein reduces outward in a plane direction. When the low-concentration portion has the concentration gradient, an abrupt reduction in polarization performance in the end portion can be suppressed while the occurrence of the crack is suppressed. The content of boric acid in the other site is, for example, from 20 wt % to 30 wt %.

The low-concentration portion is preferably formed in a region ranging from an end surface of the polarizer (resin film) to a position distant therefrom by 50 μm or more inward in the plane direction, and is more preferably formed in a region ranging from the end surface of the polarizer to a position distant therefrom by 80 μm or more. When the low-concentration portion is formed within such range, the durability-improving effect can be sufficiently obtained. Meanwhile, the low-concentration portion is preferably formed in a region ranging from the end surface of the polarizer to a position distant therefrom by 1,000 μm or less inward in the plane direction, and is more preferably formed in a region ranging to a position distant therefrom by 500 μm or less.

When a through-hole is formed like the illustrated example, the position of the through-hole may be appropriately set in accordance with, for example, the applications of the polarizer. The crack is liable to occur from the peripheral edge of the through-hole serving as a starting point, and the tendency may be more remarkable as the position of the through-hole becomes more distant from the outer edge of the polarizer. As a result, as the position of the through-hole becomes more distant from the outer edge of the polarizer (e.g., its distance from the outer edge of the polarizer is 1.5 mm or more), the durability-improving effect exhibited by the formation of the low-concentration portion can be more significantly obtained.

In the outer edge portion 101, the low-concentration portion is preferably formed in at least a boundary portion 41 or 42 between the respective display portions. Specifically, the low-concentration portion is preferably formed in a site whose outer edge forms a V-shape (including an R-shape) that is convex inward in the plane direction. This is because the site whose outer edge forms a V-shape that is convex inward in the plane direction is liable to serve as the starting point of the crack as in the peripheral edge of the through-hole.

The low-concentration portion is preferably formed in an end portion in the absorption axis direction of the polarizer. The crack tends to occur along the absorption axis direction of the polarizer, and hence the formation of the low-concentration portion in the end portion in the absorption axis direction can effectively suppress the occurrence of the crack.

The polarizer (resin film) typically contains a dichromatic substance. Examples of the dichromatic substance include iodine and an organic dye. Those substances may be used alone or in combination thereof. Of those, iodine is preferably used.

The concentrations of components contained in the polarizer, such as the dichromatic substance, may be lower in the low-concentration portion than in the other site. Examples of the components contained in the polarizer except boric acid and the dichromatic substance include components contained in solutions to be used for various treatments for obtaining the polarizer, which are described later (specifically solutions each having dissolved therein an iodide, such as potassium iodide).

In one embodiment, the polarizer (resin film) 10 contains a substance capable of forming a counterion for iodine, and has a high-concentration portion, which contains a higher concentration of the substance than that in any other site, formed in each of end portions thereof (specifically the outer edge portion 101 and the peripheral edge portions 51a and 61a of the through-holes 51 and 61). Examples of the substance capable of forming a counterion for iodine include metals capable of forming halides, such as potassium, sodium, lithium, zinc, aluminum, lead, copper, barium, calcium, tin, and titanium. Of those, potassium or sodium is preferably used. In the resin film, the substance capable of forming a counterfoil for iodine may adopt any appropriate state. Specifically, the substance may be in a state of an ion or may be in a state of being bonded to any other substance, or these states may be mixed. Examples of the other substance include an iodine ion ($I^-$) and an iodine complex ($I_3^-$).

The high-concentration portion has, for example, such a concentration gradient that the concentration of the substance capable of forming a counterion for iodine contained therein increases outward in the plane direction. The content of the substance capable of forming a counterion for iodine in the other site is, for example, from 0.3 wt % to 5 wt %. The substance capable of forming a counterion for iodine in the other site may be mainly a substance that has been introduced into the resin film during various treatments, such as a dyeing treatment, a cross-linking treatment, and a washing treatment, which are described later.

The high-concentration portion is preferably formed in a region ranging from the end surface of the polarizer (resin film) to a position distant therefrom by 100 μm or more inward in the plane direction, and is more preferably formed in a region ranging from the end surface of the polarizer to a position distant therefrom by 500 μm or more. Meanwhile, the high-concentration portion is preferably formed in a region ranging from the end surface of the polarizer to a position distant therefrom by 2,000 μm or less inward in the plane direction, and is more preferably formed in a region ranging to a position distant therefrom by 1,000 μm or less.

When the high-concentration portion is formed, the heat resistance of the resin film can be improved. It is preferred that the region of the high-concentration portion include the region of the low-concentration portion of boric acid. Specifically, the region of the high-concentration portion is formed in correspondence to the region of the low-concentration portion of boric acid. It is more preferred that the high-concentration portion be formed in a region including the entirety of the region of the low-concentration portion of boric acid. When the low-concentration portion of boric acid is formed in a region ranging from the end surface of the resin film to a predetermined position inward in the plane direction, the high-concentration portion is preferably formed to extend from the low-concentration portion of boric acid by 100 μm or more inward in the plane direction. According to such mode, the heat resistance can be reliably improved. As described above, the rigidity of the low-concentration portion of boric acid may be made lower than that of the other site by the removal of the cross-linked structure based on boric acid. Accordingly, while the occurrence of the crack is suppressed, the heat resistance may reduce. One possible cause for the foregoing is that in the low-concentration portion of boric acid, the content of an iodine complex (e.g., $I_3^-$ or $I_5^-$) is low and the content of an iodine ion (e.g., $I^-$ or $I_3^-$) is high. While the iodine complex may be aligned in the resin film, the iodine ion may be present in an instable state in the resin film. Accordingly, when the high-concentration portion is formed to introduce a counterion, the iodine ion can be stabilized to contribute to the improvement of the heat resistance of the resin film (e.g., the suppression of the coloring of the resin film through the suppression of polyene formation). It is considered that the content of iodine ($I_2$) is also high in the low-concentration portion of boric acid, and the iodine may be present in an instable state in the resin film.

The polarizer preferably shows absorption dichroism in the wavelength range of from 380 nm to 780 nm. The single axis transmittance (Ts) of the polarizer is preferably 40% or more, more preferably 41% or more, still more preferably 42% or more, particularly preferably 43% or more. A theoretical upper limit for the single axis transmittance is 50%, and a practical upper limit therefor is 46%. In addition, the single axis transmittance (Ts) is a Y value measured with the two-degree field of view (C light source) of JIS Z 8701 and subjected to visibility correction, and may be measured with, for example, a spectrophotometer (manufactured by JASCO Corporation, V7100). The polarization degree of the polarizer is preferably 99.8% or more, more preferably 93.3% or more, still more preferably 99.95% or more.

The thickness of the polarizer may be set to any appropriate value. The thickness is typically from 1 μm to 80 μm, preferably from 3 μm to 40 μm.

As formation materials for the protective film, there are given, for example, a cellulose-based resin, such as diacetyl cellulose or triacetyl cellulose (TAG), a (meth)acrylic resin, a cycloolefin-based resin, an olefin-based resin, such as polypropylene, an ester-based resin, such as a polyethylene terephthalate-based resin, a polyamide-based resin, a polycarbonate-based resin, and copolymer resins thereof. The term "(meth)acrylic resin" refers to an acrylic resin and/or a methacrylic resin.

The thickness of the protective film is preferably from 10 μm to 200 μm. A surface-treated layer may be formed on one side of the protective film (side on which the polarizer is not arranged). Specifically, the side may be subjected to a hard coat treatment, an antireflection treatment, or a treatment intended for diffusion or anti-glaring. The constructions (including a formation material and a thickness) of the pair of protective films may be identical to each other, or may be different from each other.

The protective film is typically laminated on the surface of the polarizer through intermediation of an adhesive layer. Any appropriate adhesive may be used as an adhesive. For example, an aqueous adhesive, a solvent-based adhesive, or an active energy ray-curable adhesive is used. An adhesive containing a PVA-based resin is preferably used as the aqueous adhesive.

The polarizer (polarizing plate) of the present invention is not limited to the construction of the illustrated example, and may be appropriately changed. For example, the shape of the polarizer (polarizing plate), the presence or absence of the through-holes, the shapes and sizes of the through-holes, and the number and formation positions of the through-holes may be appropriately changed.

B. Production Method for Polarizer (Polarizing Plate)

The low-concentration portion is preferably formed by bringing a treatment liquid into contact with a resin film containing boric acid. According to such mode, the low-concentration portion can be easily formed in a desired site. Specifically, the low-concentration portion can be satisfactorily formed through the elution of boric acid into the treatment liquid. Any appropriate method may be adopted as a contact method for the treatment liquid. Specific examples thereof include: a method involving immersing the resin film in the treatment liquid; a method involving applying the treatment liquid to the resin film; and a method involving spraying the treatment liquid onto the resin film. Of those, a method involving immersing the resin film in the treatment liquid is preferably adopted.

For example, water, alcohols, such as methanol and ethanol, dimethyl sulfoxide, dimethyl formamide, dimethylacetamide, N-methylpyrrolidone, various glycols, polyhydric alcohols, such as trimethylolpropane, and amines, such as ethylenediamine and diethylenetriamine, are used for the treatment liquid. Those solvents may be used alone or in combination thereof. Of those, water is preferably used.

The treatment liquid may contain a substance capable of forming a counterion for iodine. In this case, the treatment liquid is typically a solution obtained by dissolving, in the solvent, a compound containing the substance capable of forming a counterion for iodine. When such treatment liquid is used, the high-concentration portion can be formed through the introduction of the substance capable of forming a counterion for iodine into the resin film simultaneously with the formation of the low-concentration portion.

Examples of the compound containing the substance capable of forming a counterion for iodine include halides (preferably iodides and chlorides) of potassium, sodium, lithium, sine, aluminum, lead, copper, barium, calcium, tin, and titanium. Of those, potassium iodide and sodium chloride are preferably used. The compounding amount of such compound is preferably from 0.1 part by weight to 10 parts by weight, more preferably from 1 part by weight to 5 parts by weight with respect to 100 parts by weight of the solvent.

In one embodiment, the treatment liquid is a basic solution. In this case, the treatment liquid may be obtained by compounding the solvent with a basic compound. Examples of the basic compound include: hydroxides of alkali metals, such as sodium hydroxide, potassium hydroxide, and lithium hydroxide; hydroxides of alkaline earth metals, such as calcium hydroxide; inorganic alkali metal salts, such as sodium carbonate; and organic alkali metal salts, such as sodium acetate. Those basic compounds may be used alone or in combination thereof. The concentration of the basic solution is, for example, from 1 N to 10 N.

In another embodiment, the treatment liquid is an acidic solution. In this case, the treatment liquid may be obtained by compounding the solvent with an acidic compound. Examples of the acidic compound include: inorganic acids, such as hydrochloric acid, sulfuric acid, nitric acid, and hydrogen fluoride; and organic acids, such as formic acid, oxalic acid, citric acid, acetic acid, and benzoic acid. Those acidic compounds may be used alone or in combination thereof. The concentration of the acidic solution is, for example, from 1 N to 10 N.

The treatment liquid may contain an additive.

The liquid temperature of the treatment liquid (at the time of the contact) is preferably 50° C. or more, more preferably 60° C. or more. This is because the low-concentration portion can be satisfactorily formed. Meanwhile, the liquid temperature of the treatment liquid (at the time of the contact) is preferably 90° C. or less. In a preferred embodiment, under a state in which the treatment liquid is brought into contact with the resin film, the treatment liquid is warmed so that the treatment liquid may have a predetermined temperature (the temperature of the treatment liquid may be maintained at the predetermined temperature). When the resin film is immersed in the treatment liquid, an immersion time is, for example, from 3 minutes to 20 minutes.

When the treatment liquid is brought into contact with the resin film, the treatment liquid may be subjected to an ultrasonic treatment. Specifically, the resin film is immersed in an ultrasonic bath. According to such mode, the low-concentration portion can be efficiently formed. The ultrasonic treatment may be performed under any appropriate conditions. An output is, for example, from 40 W to 1,000 W. A frequency is, for example, from 15 kHz to 100 kHz.

When the treatment liquid is brought into contact with the resin film, the resin film is preferably in a state of being usable as a polarizer having been subjected to various treatments, such as a swelling treatment, a stretching treatment, a dyeing treatment with the dichromatic substance, a cross-linking treatment, a washing treatment, and a drying treatment. The resin film containing boric acid is obtained by, for example, bringing a boric acid solution (e.g., an aqueous solution of boric acid) into contact with the resin film during the stretching treatment or the cross-linking treatment. When the resin film is subjected to the various treatments, the resin film may be a resin layer formed on a substrate. A stretching direction in the stretching treatment may correspond to the absorption axis direction of the polarizer to be obtained. In ordinary cases, the resin film is uniaxially stretched at from 3 times to 7 times from the viewpoint that excellent polarization characteristics are obtained.

Figure 3:
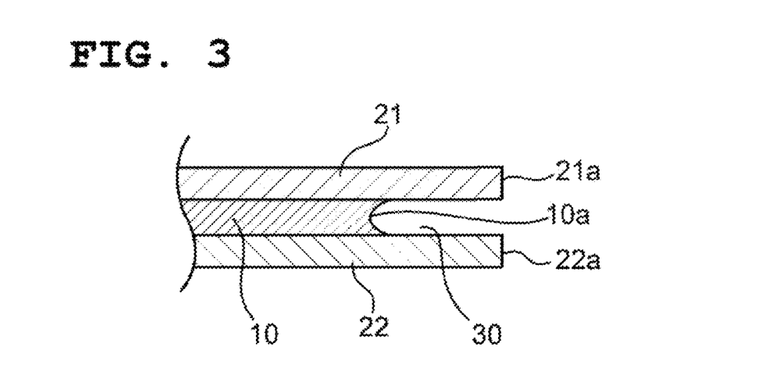
FIG. 3 is an enlarged sectional view of an end portion of a polarizing plate according to one embodiment of the present invention.

It is preferred that the resin film containing boric acid be covered with a cover film and the treatment liquid be selectively brought into contact with a desired site. A film that can be utilized as it is as a protective film after the contact with the treatment liquid is preferably used as the cover film. In one embodiment, a laminate obtained by laminating a protective film on each of both main surfaces of the resin film (polarizer) containing boric acid is immersed in the treatment liquid to form the low-concentration portion. According to such method, the low-concentration portion and/or the high-concentration portion having the concentration gradient can be satisfactorily formed. In addition, according to such method, as illustrated in FIG. 3, an end surface 10a of the polarizer 10 can be positioned inward in the plane direction relative to each of end surfaces 21a and 22a of the protective films 21 and 22, and thus a polarizer void portion 30 can be formed. When the polarizer void portion is formed, the durability can be further improved.

Forming into a desired shape as illustrated in FIG. 1 is typically performed by cutting and/or punching. It is preferred that the cutting and/or punching be performed before the formation of the low-concentration portion. In addition, the cutting and/or punching may be performed for the polarizer (resin film) alone, but it is preferred that the cutting and/or punching be performed for a laminate of the polarizer and a protective film. In a preferred embodiment, the laminate of the polarizer and the protective film is formed into a desired shape by cutting and/or punching, and then the low-concentration portion is formed.

Any appropriate method may be adopted as a method for the cutting (punching). Examples thereof include: a method involving using a cutting blade (punching die), such as a Thomson blade or a pinnacle blade; and a method involving irradiation with laser light. Of those, cutting by laser light irradiation is preferably adopted. The laser light irradiation provides a smooth cut surface and can suppress the occurrence of the starting point of a crack (initial crack).

Any appropriate laser may be adopted as the laser. A laser that can emit light having a wavelength in the range of from 150 nm to 11 μm is preferably used. Specific examples thereof include: a gas laser, such as a $CO_2$ laser; a solid laser, such as a YAG laser; and a semiconductor laser. Of those, a $CO_2$ laser is preferably used.

A condition for the laser light irradiation may be set to any appropriate condition depending on, for example, the laser to be used. When the $CO_2$ laser is used, an output condition is preferably from 10 W to 1,000 W, more preferably from 100 W to 400 W.

The resin film (laminate) may be subjected to the drying treatment after its contact with the treatment liquid. A drying temperature is, for example, from 50° C. to 120° C.

EXAMPLES

Now, the present invention is specifically described by way of Examples. However, the present invention is not limited to these Examples.

Example 1

Production of Polarizer

A polymer film containing a PVA-based resin as a main component was stretched by being sequentially immersed in the following five baths [1] to [5] while tension was applied in the lengthwise direction of the film. The stretched film was dried to provide a polarizer having a thickness of 28 μm.

Conditions

[1] Swelling bath: pure water at 30° C.
[2] Dyeing bath: aqueous solution at 30° C. containing iodine and potassium iodide
[3] First cross-linking bath: aqueous solution at 40° C. containing potassium iodide and boric acid
[4] Second cross-linking bath: aqueous solution at 60° C. containing potassium iodide and boric acid
[5] Washing bath: aqueous solution at 25° C. containing potassium iodide Production of Polarizing Plate Sheet A PVA-based adhesive was applied to one side of the polarizer so that its thickness after drying became 100 nm, and an elongated TAC film having a thickness of 40 μm was bonded to the polarizer so that their lengthwise directions were aligned with each other.

Subsequently, a PVA-based was applied to the other side of the polarizer so that its thickness after drying became 100 nm, and an elongated acrylic film having a thickness of 30 μm was bonded to the polarizer so that their lengthwise directions were aligned with each other.

Thus, a polarizing plate sheet having a construction "TAC film/polarizer/acrylic film" was obtained.

The resultant polarizing plate sheet was cut with a $CO_2$ laser (wavelength: 9.35 μm, output: 150 W) to provide a cut piece of a size measuring 54 mm by 54 mm, the cut piece having a through-hole having a diameter of 4 mm formed in a site distant from its outer edge by 25 mm.

The resultant cut piece was immersed in warm water kept at 74° C. for 16 minutes to provide a polarizing plate.

Example 2

A polarizing plate was obtained in the same manner as in Example 1 except that the size of the cut piece was set to 94 mm by 94 mm; and the through-hole was formed in a site distant from the outer edge of the cut piece by 45 mm.

Example 3

A polarizing plate was obtained in the same manner as in Example 1 except that: the size of the cut piece was set to 114 mm by 114 mm; and the through-hole was formed in a site distant from the outer edge of the cut piece by 55 mm.

Example 4

A polarizing plate was obtained in the same manner as in Example 1 except that the cut piece was immersed in a 3 wt % aqueous solution of potassium iodide kept at 14° C. instead of the warm water kept at 74° C.

Comparative Example 1

A polarizing plate was obtained in the same manner as in Example 1 except that the cut piece was not immersed in warm water.

Comparative Example 2

A polarizing plate was obtained in the same manner as in Example 2 except that the cut piece was not immersed in warm water.

Comparative Example 3

A polarizing plate was obtained in the same manner as in Example 3 except that the cut piece was not immersed in warm water.

Each of the resultant polarizing plates was subjected to a heat cycle (HS) test. Specifically, a test sample was obtained by bonding the resultant polarizing plate to a glass plate with an acrylic pressure-sensitive adhesive (thickness: 20 μm). The sample was left to stand under an environment at −40° C. for 30 minutes and then left to stand under an environment at 85° C. for 30 minutes. The foregoing operation was defined as one cycle and the cycle was repeated 100 times. After that, whether or not a crack occurred in the polarizing plate was observed.

Figure 4:
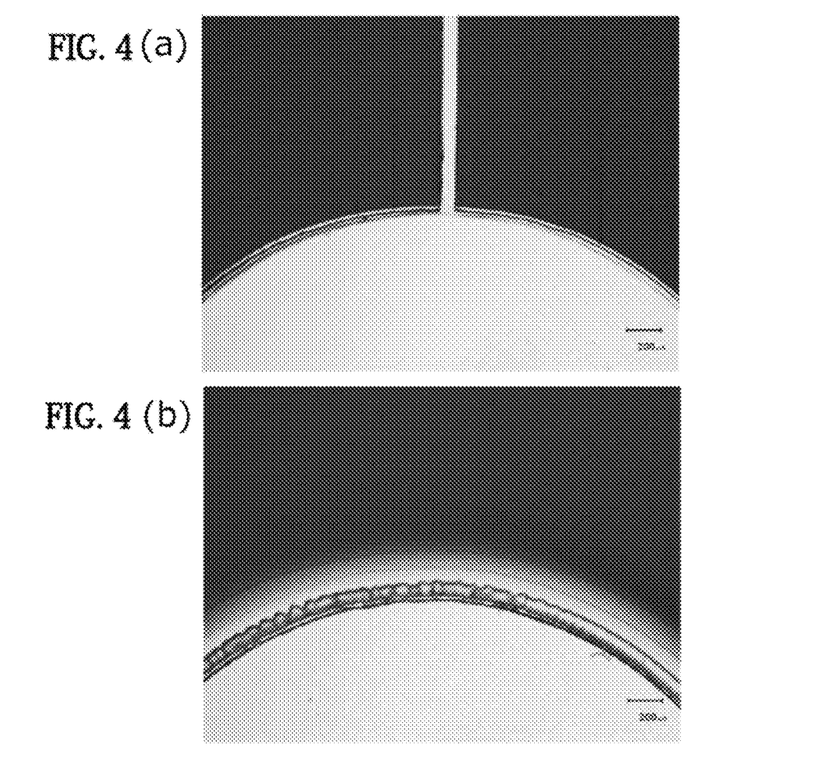
FIG. 4(a) is a photograph for showing the external appearance of a polarizing plate of Comparative Example 3 after a heat cycle test.
FIG. 4(b) is a photograph for showing the external appearance of a polarizing plate of Example 3 after a heat cycle test.

In the polarizing plate of each of Examples, the occurrence of a crack (including a small crack) was not observed after the HS test, whereas in the polarizing plate of each of Comparative Examples, a crack occurred along the stretching direction after the HS test, as shown in the photographs of FIG. 4 obtained by observation with an optical microscope (manufactured by Olympus Corporation, MX61, magnification: 5). In Comparative Example 1, a crack length was as small as 12 mm, but in each of Comparative Examples 2 and 3, the crack extended from the through-hole serving as a starting point to an end side of the polarizing plate.

The polarizing plate of each of Example 1 and Example 4 was subjected to a heat resistance test. Specifically, a test sample was obtained by bonding the polarizing plate to a glass plate with an acrylic pressure-sensitive adhesive (thickness: 20 μm). The sample was left to stand under an atmosphere at 105° C. for 140 hours. After the heat resistance test, whether or not the polarizing plate was colored was observed.

Figure 5A:
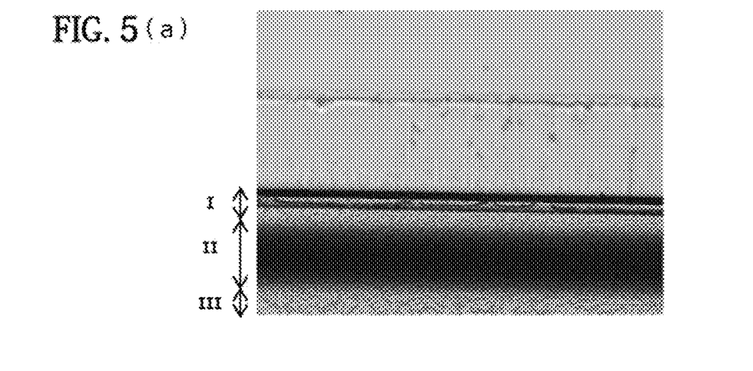
FIG. 5(a) is a photograph obtained by observing an end portion of a polarizing plate of Example 1 after a heat resistance test with an optical microscope.
Figure 5B:
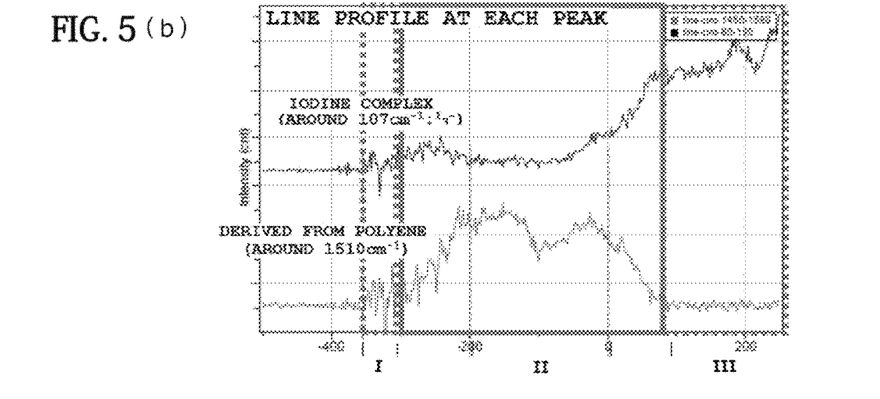
FIG. 5(b) is a graph for showing the results of analysis thereof by microscopic Raman spectroscopy.

In Example 4, no coloring was found after the heat resistance test, whereas in Example 1, a colored portion having a Width of about 300 μm was found along an end side of the polarizing plate as shown in the photograph of FIG. 5(a) obtained by observation with an optical microscope (manufactured by Olympus Corporation, MX61, magnification: 5). The results of analysis of an end portion of the polarizing plate of Example 1 after the heat resistance test by microscopic Raman spectroscopy are shown in FIG. 5(b). The results suggest that the coloring is due to polyene formation. In the colored portion, the content of an iodine complex ($I_3^-$) is markedly low as compared to that in a non-colored portion. Measurement conditions for the microscopic Raman spectroscopy are as described below.

Apparatus: microscopic laser Raman (Jobin Yvon S.A.S., LabRAM HR800)
Excitation wavelength: 514 nm
Measurement wavelength range: about 80 $cm^{-1}$ to about 1,800 $cm^{-1}$
Grating: 600 gr/mm
Objective lens: ×100
Accumulation time: 2 sec
Accumulation number: 2
Filter: D3
Hole: 300
Detector: CCD The polarizing plate of each of Example 1, Example 4, and Comparative Example 1 was subjected to the following evaluations.

1. Concentration Distribution Measurement

A boric acid concentration distribution in an end portion of the polarizer in a plane direction was measured. The measurement Was performed with a time-of-flight secondary ion mass spectrometer (TOF-SIMS) (manufactured by ION-TOF GmbH, product name: TOF-SIMS 5). As a measurement sample, the resultant polarizing plate was embedded in a resin, and a cross-section of the resultant prepared with a microtome was used. Measurement conditions are as described below.
Primary ion for irradiation: $Bi_3^{2+}$
Primary ion acceleration voltage: 25 kV
Measurement area: 300-micrometer square×two fields of view
An electron gun for charge correction was used in the measurement.

2. Observation with Optical Microscope

A polarizing plate having an end portion embedded in a resin was cut in its thickness direction, and the cut surface was observed with an optical microscope (manufactured by Nikon Corporation, ECLIPSE LV100, magnification: 50).

Figure 6A:
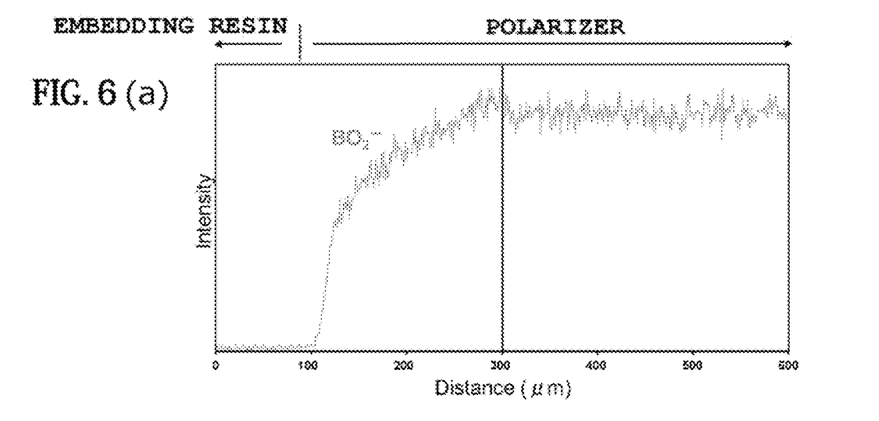
FIG. 6(a) is a graph for showing a boric acid concentration distribution in an end portion of a polarizer of Example 1 in a plane direction.
Figure 6B:
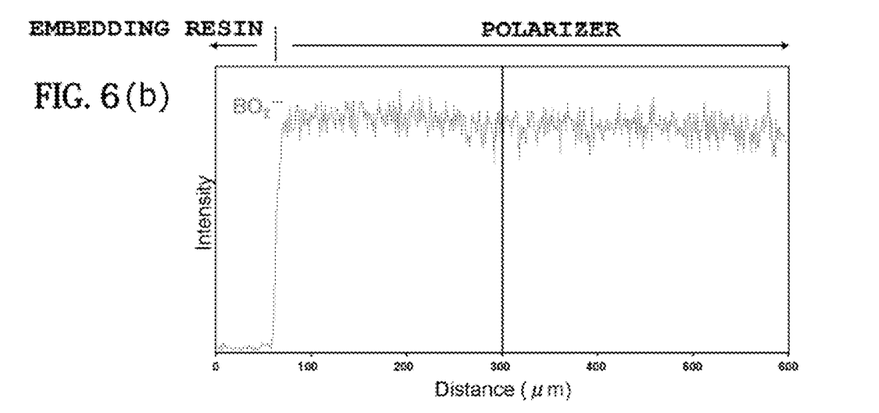
FIG. 6(b) is a graph for showing a boric acid concentration distribution in an end portion of a polarizer of Comparative Example 1 in a plane direction.

FIG. 6(a) is a graph for showing a boric acid concentration distribution in an end portion of a polarizer of Example 1 in a plane direction, and FIG. 6(b) is a graph for showing a boric acid concentration distribution in an end portion of a polarizer of Comparative Example 1 in a plane direction. It was found that a low-concentration portion having such a concentration gradient that the concentration of boric acid contained therein reduced outward was formed in the end portion of the polarizer of Example 1. It was found that a low-concentration portion of boric acid was also formed in the end portion of the polarizer of Example 4.

Figures 7A, 7B, 7C:
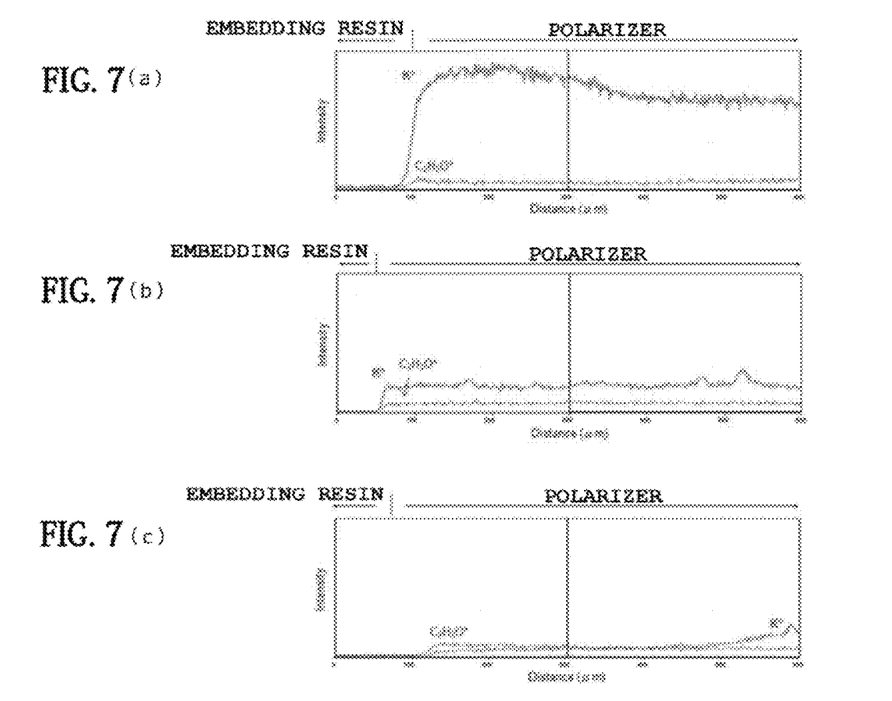
FIG. 7(a) is a graph for showing a potassium concentration distribution in an end portion of a polarizer of Example 4 in a plane direction.
FIG. 7(b) is a graph for showing a potassium concentration distribution in the end portion of the polarizer of Comparative Example 1 in the plane direction.
FIG. 7(c) is a graph for showing a potassium concentration distribution in the end portion of the polarizer of Example 1 in the plane direction.

FIG. 7(a) is a graph for showing a potassium concentration distribution in an end portion of a polarizer of Example 4 in a plane direction, FIG. 7(b) is a graph for showing a potassium concentration distribution in the end portion of the polarizer of Comparative Example 1 in the plane direction, and FIG. 7(c) is a graph for showing a potassium concentration distribution in the end portion of the polarizer of Example 1 in the plane direction. It was found that a high-concentration portion having such a concentration gradient that the concentration of potassium contained therein increased outward was formed in the end portion of the polarizer of Example 4. The concentration of potassium contained in the high-concentration portion was up to about 10 times as high as the concentration of potassium contained in a central portion of the polarizer.

Figure 8A:
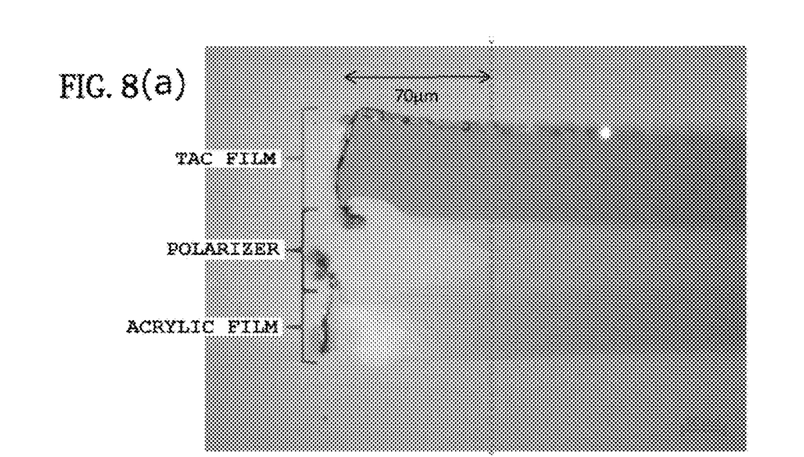
FIG. 8(a) is a photograph obtained by observing an end portion of the polarizing plate of Example 1 with an optical microscope.
Figure 8B:
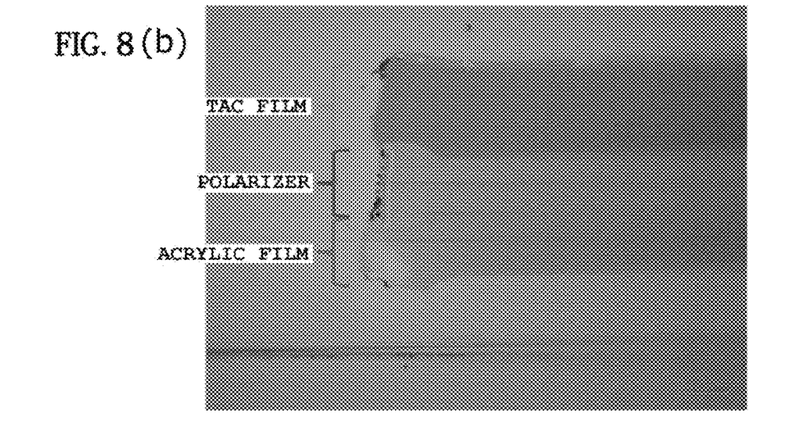
FIG. 8(b) is a photograph obtained by observing an end portion of a polarizing plate of Comparative Example 1 with an optical microscope.

FIG. 8 are each a photograph obtained by observation with an optical microscope, FIG. 8(a) is a photograph for showing an end portion of the polarizing plate of Example 1, and FIG. 8(b) is a photograph for showing an end portion of the polarizing plate of Comparative Example 1. It was found that a polarizer void portion was formed in the end portion of the polarizing plate of Example 1. In Example 4, a result similar to that of Example 1 was obtained.

INDUSTRIAL APPLICABILITY

The polarizer of the present invention can be suitably used not only in an image display apparatus (a liquid crystal display apparatus or an organic EL device) of a rectangular shape but also in, for example, an image display portion of a particular shape typified by the meter display portion of an automobile or a smart watch.

REFERENCE SIGNS LIST

10 polarizer
21, 22 protective film
100 polarizing plate

The invention claimed is:
1. A polarizer, comprising a resin film containing boric acid, wherein the resin film has a low-concentration portion, Which contains a lower concentration of the boric acid than that in any other site, formed in an end portion thereof.
2. The polarizer according to claim 1, wherein the low-concentration portion has such a concentration gradient that the concentration of the boric acid contained therein reduces outward in a plane direction.
3. The polarizer according to claim 1, wherein the low-concentration portion is formed in a region ranging from an end surface of the resin film to a position distant therefrom by 50 μm or more inward in a plane direction.
4. The polarizer according to claim 1, wherein the low-concentration portion is formed in the end portion in an absorption axis direction.

5. The polarizer according to claim 1, wherein the polarizer has formed therein a through-hole and the low-concentration portion is formed in a peripheral edge portion of the through-hole.

6. The polarizer according to claim 1, wherein the low-concentration portion is formed in an outer edge portion.

7. The polarizer according to claim 6, wherein the outer edge portion includes a site that forms a substantially V-shape that is convex inward in a plane direction.

8. A polarizing plate, comprising:
the polarizer of claim 1; and
a protective film arranged on at least one surface of the polarizer.

9. A production method for a polarizer, comprising a step of bringing a treatment liquid into contact with, a resin film containing boric acid, to thereby form a low-concentration portion, which contains a lower concentration of the boric acid than that in any other site, in an end portion of the resin film.

10. The production method according to claim 9, wherein the treatment liquid contains water.

11. The production method according to claim 9, wherein the treatment liquid comprises a solution obtained by dissolving, in a solvent, a compound containing a substance capable of forming a counterion for iodine.

12. The production method according to claim 11, wherein the compound contains potassium iodide and/or sodium chloride.

13. The production method according to claim 9, wherein the treatment liquid has a liquid temperature of 50° C. or more.

14. The production method according to claim 9, further comprising a step of forming the resin film containing boric acid into a desired shape through cutting or punching.

15. The production method according to claim 14, wherein the cutting and/or the punching is performed by laser light irradiation.

16. The production method according to claim 15, wherein the laser light comprises $CO_2$ laser light.

* * * * *

UNITED STATES PATENT AND TRADEMARK OFFICE
CERTIFICATE OF CORRECTION

PATENT NO. : 10,107,947 B2
APPLICATION NO. : 15/545766
DATED : October 23, 2018
INVENTOR(S) : Katsunori Takada et al.

Page 1 of 1

It is certified that error appears in the above-identified patent and that said Letters Patent is hereby corrected as shown below:

In the Claims

Column 12 Line 55:
Change
Which contains a lower concentration of the boric acid than
To be
which contains a lower concentration of the boric acid than Column 12 Line 66:
Change
concentration portion is formed in the end portion in an
To be
concentration portion is formed in an end portion in an Column 13 Line 15:
Change
of bringing a treatment liquid into contact with, a resin film
To be
of bringing a treatment liquid into contact with a resin film Signed and Sealed this
Fifth Day of March, 2019

Andrei Iancu
*Director of the United States Patent and Trademark Office*